United States Patent
Burling-Claridge et al.

(10) Patent No.: US 6,958,479 B2
(45) Date of Patent: Oct. 25, 2005

(54) METHOD OF PROCESSING DATA FROM A SPECTROPHOTOMETER

(76) Inventors: Geordie Robert Burling-Claridge, 20 Cricket Place, Hamilton (NZ); Peter James Davey, 52 Clarkin Rd., Woodstock, Hamilton (NZ); John C. M Lea, 3 Maungarel Rd., Auckland (NZ)

( * ) Notice: Subject to any disclaimer, the term of this patent is extended or adjusted under 35 U.S.C. 154(b) by 0 days.

(21) Appl. No.: 10/290,205

(22) Filed: Nov. 8, 2002

(65) Prior Publication Data
US 2003/0122080 A1 Jul. 3, 2003

Related U.S. Application Data

(63) Continuation of application No. PCT/NZ01/00088, filed on May 11, 2001.

(30) Foreign Application Priority Data

May 12, 2000 (NZ) .................................. 504536

(51) Int. Cl.[7] ............................ G01J 5/02; G01J 3/02
(52) U.S. Cl. ......................... 250/339.09; 250/339.07; 250/339.12; 250/341.5
(58) Field of Search ..................... 250/339.09, 339.11, 250/339.12, 341.5, 341.8, 339.07

(56) References Cited

U.S. PATENT DOCUMENTS

| | | | |
|---|---|---|---|
| 3,847,486 A | 11/1974 | McCabe | |
| 4,264,205 A | 4/1981 | Landa | |
| 4,635,735 A | 1/1987 | Crownover | |
| 4,664,522 A * | 5/1987 | LeFebre | 356/328 |
| 4,798,464 A | 1/1989 | Boostrom | |
| 4,969,739 A | 11/1990 | McGee | |
| 5,251,006 A | 10/1993 | Honigs et al. | |
| 5,400,138 A | 3/1995 | Peterson et al. | |
| 5,428,558 A * | 6/1995 | Cahill et al. | 356/319 |
| 5,652,653 A * | 7/1997 | Alsmeyer et al. | 356/301 |
| 5,691,817 A | 11/1997 | Cargill et al. | |
| 5,696,591 A * | 12/1997 | Bilhorn et al. | 356/429 |
| 5,701,175 A | 12/1997 | Kostizak et al. | |
| 5,779,631 A | 7/1998 | Chance | |
| 5,953,118 A | 9/1999 | O'Rourke et al. | |
| 6,043,894 A | 3/2000 | Aken et al. | |
| 6,118,529 A * | 9/2000 | Spragg | 356/307 |
| 6,515,273 B2 * | 2/2003 | Al-Ali | 250/214.1 |
| 6,630,672 B1 * | 10/2003 | Brotherton et al. | 250/339.07 |

FOREIGN PATENT DOCUMENTS

| | | |
|---|---|---|
| EP | 0658751 B | 6/1995 |
| EP | 0658751 A2 | 6/1995 |

* cited by examiner

*Primary Examiner*—Albert Gagliardi
(74) *Attorney, Agent, or Firm*—Lowe Hauptman & Berner, LLP

(57) ABSTRACT

A method of processing data from at least one spectrophotometer characterized by the steps of transferring the data from the spectrophotometer to a control processing unit, processing the data at the central processing unit, and transferring the processed data to the output device.

22 Claims, 2 Drawing Sheets

METHOD OF PROCESSING DATA FROM A SPECTROPHOTOMETER

This application is a continuation of PCT/NZ01/00088 filed May 11, 2001.

FIELD OF THE INVENTION

This invention relates to a method of processing data.

In particular, the present invention relates to a method of processing data from a spectrophotometer. The present invention has particular application to the processing of data from near infrared spectrophotometers, although it should be appreciated that the present invention can be applied to other types of spectrophotometers.

BACKGROUND OF THE INVENTION

Near infrared spectrophotometers (NIRS) are used in a wide variety of industries to analyze the composition of various materials. These NIRS are particularly useful in determining the composition of materials, if there are contaminants in certain materials and can provide the results of analysis within a matter of minutes. In contrast, chemical tests often take days to provide the results of analysis, by which time it may be too late to stop contaminated or otherwise inappropriate material from being used where it shouldn't be. NIRS are also more reliable and faster to calibrate than standard research spectrophotometers.

However, these machines also have a number of problems associated with them.

One problem is that most NIRS have to be individually calibrated. This is because the analysis of the data relies on determining the difference between a reference spectra and the spectra received back from the sample. This is a complex relationship and thus, anything that can affect the light path of the machine can affect its calibration. Unfortunately it takes a long time to calibrate a NIRS and the cost of doing so is approximately as expensive as the machine. However, once calibrated, the machine can work inexpensively and quickly.

A further problem can arise in that a separate calibration is required for every physical test. Thus, if the NIRS is expected to test a number of different materials, a considerable time can be spent in calibrating the machine to give meaningful results.

Because of this, at present there are a large number of organizations having a number of NIRS machines all operating independently and with separate calibrations.

Another problem is that if a machine breaks down, a considerable amount of time is required to install another machine. Usually the replacement machine has to be recalibrated while the previous machine is being repaired.

Another problem is that the on-board processing of NIRS machines is not fast enough to provide real-time results. This is a problem in that often NIRS machines are used in production lines, for example, on-line sampling of oil, wheat and so forth. A delay of some minutes before detecting whether there is say a contaminant, or a certain quality of the material, can radically slow down the production line, or result in the contaminated material not being removed from the rest of the material.

Although it may be possible to incorporate more powerful onboard processing into the NIRS, it is expensive to do so and the cost also mounts up when multiplied by a number of machines.

Yet another problem with NIRS machines is that their compactness enables them to be readily stolen and used elsewhere.

There have been several types of spectrophotometer systems designed in order to try and overcome of the problems previously mentioned, one of which was disclosed in U.S. Pat. No. 5,953,118, of O'Rourke et al, which issued Sep. 14, 1999.

The patent disclosed "According to its major aspects and broadly stated, the present invention is a high-resolution, high-sensitivity multiplexed spectrophotometry apparatus that includes an optical multiplexer with a plurality of fiber terminals, a spectrophotometer operatively connected to the multiplexer, a programmable on-board computer with chemometric software, and, in a preferred embodiment of the invention, at least one light source."

"A major feature of the present invention is the spectrophotometer, which includes precision holographic optics, a charge coupled device (CCD) detector, electronics, and an integral cooling system. These components are fitted into a compact, streamlined housing that serves as both the spectrophotometer housing and the detector housing. The spectrophotometer is mounted to the multiplexer so that any selected optical terminal can readily be brought into precise, reproducible alignment with the spectrophotometer input."

". . . with a repeatability of no more than approximately 5 microns (that is, reproducible positioning to within 5 microns or less), attainable switching times no greater than approximately 1 second/channel, and high total optical throughput."

These sections within the specification clearly show that each spectrometer has its own onboard programmable computer and is totally reliant upon the performance of the optical multiplexer.

Due to the long switching times of approximately one second per channel, this invention cannot be used for real time measurements and the fact that there has to be a physical realignment within the multiplexer for each individual input means that the accuracy and repeatability of measurements must be questioned.

This is not only due to the probability of inaccurate repositioning but also to the fact that mechanical movement of the optical system can introduce debris into the optical path thereby making any further readings inaccurate.

A further problem is that each spectrometer of U.S. Pat. No. 5,953,118 would need to be calibrated individually and it does not have a central store of calibration figures or results.

U.S. Pat. No. 5,701,175, of Kositzak et al, which issued Dec. 23, 1997, discloses a moveable spectrophotometer wherein a programmed computer can be used for identifying the position of the spectrophotometer at a given time, as can be seen from its abstract.

"A spectrophotometer mouse is provided for making color spectrum measurements of desired areas on a surface over which the mouse is moveable. The spectrophotometer mouse includes a housing shaped to conform to the hand of an operator, and a spectrophotometer in the housing having an input (such as a light receiving aperture) for measuring the color spectrum of the target area on the surface. The mouse has a position sensing encoder which is coupled to a programmed computer for identifying the position of the mouse on the surface. This programmed computer may be internal or external of the housing. The computer is used for locating the target area on the surface with reference to a pointer on the mouse, and then detecting when an operator has moved the mouse such that the input of the spectrophotometer is substantially coincident with the located target area. The computer automatically actuates the spectrophotometer so that the spectrum of light from the target area is received at the input of the spectrophotometer and is measured. In addition to providing color spectrum measurements of target areas on the surface, the position sensing features of the mouse can also be operated as a typical computer-type mouse for command input to a graphical user interface. Thus, the operator can use the spectrophotometer mouse to measuring the color spectrum of target areas on the surface, or as a typical computer-type mouse."

This patent only deals with a single spectrophotometer and not with a series of spectrophotometer with a centralized processing unit.

It is clear from its specification that this spectrophotometer mouse is intended to be used in a stand-alone system and not as part of a group or an array, but if a number of these mice were used together then they would still have to be calibrated individually. Therefore they would still suffer from some of the major problems described earlier.

U.S. Pat. No. 5,691,817, to Cargill et al, which issued Nov. 25, 1997, discloses an apparatus and method for calibration of a spectrophotometer.

However, the disclosure still exhibits major calibration problems as the specification clearly shows (as can be seen in the enclosed excerpt below) that the calibration must be performed on each individual spectrophotometer which is not only costly and time consuming, but is also difficult.

"A spectrophotometer apparatus (200) is adapted to provide spectral reflectance measurements of object samples. The apparatus (200) comprises a source light (254) and a reflection optics assembly (264, 268). Signals representative of reflected light are analyzed and data provided to an operator representative of the spectral response characteristics of the object sample (252). The apparatus (200) further comprises a side sensor (276) having a fixed spectral responses characteristic for compensating the reflectance measurements in accordance with the light intensity emanating from the lamp. For purposes of calibration, a series of time-sequenced measurements are made of a reference sample. Utilizing these measurements, the apparatus (200) provides computations of compensation coefficients for each spectral segment. The compensation coefficients are utilized, with the side sensor measurements, to provide normalization of the reflectance measurements for each segment and for each measurement within the timed sequence. For each segment, a scale factor is then determined. The sale factors, compensation coefficients and side sensor measurements are employed to compensate actual reflectance measurements, with further compensation provided by a determination of temperature coefficients."

It will be appreciated from the above excerpt that this patent discloses a device that is only meant to be used in a stand alone situation.

U.S. Pat. No. 5,400,138, of Peterson et al, which issued Mar. 21, 1995, discloses a portable spectrophotometer which has a data memory in which a sequence of generalized commands is stored in order that the spectrophotometer is able to perform the correct sequence of commands when used in a remote location necessitating it being disconnected from the host computer.

"A color measuring system includes a portable spectrophotometer connectable to a general-purpose computer. The portable unit includes a microprocessor with a read-only program memory storing machine executable instructions to implement data processing for color measurement purposes and input/output functions including key reading and data transfer functions and display functions. A random-access data memory is used to temporarily store process data for later transfer to the general-purpose computer. An editor program and a compiler program in the general-purpose computer may be used to generate a program for the microprocessor using high-level, generalized commands. After such a program has been written and compiled in the general-purpose computer, it is transferred to a command buffer area in the random-access data memory of the microprocessor. The microprocessor, in its program memory, includes a command interpreter including a predefined sequence of machine executable instructions for each generalized command. When executed, the command interpreter reads a generalized command from the data memory and, if necessary, updates relevant data pointers and executes the predefined sequence of machine executable functions in the program memory corresponding to the generalized command being processed. A user, using the general-purpose computer, may specify any desired sequence of measurement operations by specifying functions to be performed by the microprocessor, including the display of prompts to the operator of the portable spectrophotometer to instruct the operator to perform various specified operations."

U.S. Pat. No. 5,400,138 not only will be unable to perform real-time measurements, but each of these spectrophotometer would need to be calibrated individually and are designed to be used remotely from the host computer and not as part of a spectrophotometry array.

The device of U.S. Pat. No. 5,400,138 is very limited in its ability and applicability in that it has to be preprogrammed with a set of command instructions and is then disconnected from the host computer which greatly limits the applications in which this device would be suitable.

U.S. Pat. No. 5,251,006, to Honigs et al, which issued Oct. 5, 1999, discloses an automatic calibration system for use on a spectrophotometer; however, this device has severe limitations in that a calibration assembly must be fitted to each spectrophotometer that needs to be calibrated.

As can be seen in the following excerpt from the specification, the core of the invention is the integration of permanent reference standards within each spectrophotometer. These reference standards are used to calibrate the spectrophotometers.

"The automatic calibration apparatus according to the invention is designed to be employed in a conventional spectrophotometer such as those disclosed in the Landa U.S. Pat. No. 4,264,205 or McGee U.S. Pat. No. 4,969,739. Central to the invention, is the integration of permanent reference standards in the spectrophotometer from which the spectrophotometers are calibrated."

U.S. Pat. No. 5,251,006 uses a somewhat costly way of calibrating a number of spectrophotometers inasmuch as each spectrophotometer would need its own set of reference standards permanently within its structure.

This system has little advantage over those previously available as each spectrophotometer still has to be calibrated individually.

U.S. Pat. No. 4,798,464, of Boostrom, which issued Jan. 17, 1989, discloses a scanning array spectrophotometer which uses different light sources with overlapping spectral characteristics in order to improve the usable bandwidth of the spectrophotometer.

This patent does not disclose any method of calibration of the spectrophotometer other than to determine which range of wavelength can provide data that is free from objectionable errors that would originate from the source of each scan.

Because this is only a problem in a spectrophotometer which scans a wide range of wavelengths, for instance from 200 to 850 nanometers, it would therefore be irrelevant to any spectrophotometer that will only scan from about 390 to above 900 nanometers as this can be achieved from a single tungsten halide lamp.

U.S. Pat. No. 4,635,735, of Crownover, which issued Jan. 13, 1987, discloses a method and apparatus for the continuous analysis of drilling mud which is outlined in the following:

"An oil well drilling rig (10) recirculates drilling mud which is analyzed continuously by pumping it through a gas separation unit (72) where the gases in the mud become separated and mixed with the carrier gas and are conveyed to gas analyzing devices (196) where the concentration of the different hydrocarbon components of the gases in the mud are continuously measured and the signals representative of these measurements are processed together with mud flow rate, and the carrier gas flow rate or the sample gas flow rate signals in a signal processor (64) to provide a continuous log of gas component concentration during drilling."

This system does disclose a real-time measurement system in which the results are logged in order to ascertain the material that is being measured.

The patent, however, does not disclose a method of calibration for the sensing equipment or if calibration is indeed performed, it also appears that only a single sensing unit is connected to the computer.

U.S. Pat. No. 3,847,486, of Nov. 12, 1974, discloses an automated spectrophotometer apparatus and a computer system for simultaneous measurement of a plurality of kinetic reactions.

This invention relates to a system that is used for a single spectrophotometer to measure a number of samples in order to determine a difference between the samples being measured. The excerpts from within the specification detail the invention as disclosed.

"A spectrophotometer apparatus for the automatic positioning of multiple samples and sample blanks for measuring, for example, double differential absorbance, that is, sample absorbance with respect to both blank absorbance and time. The apparatus contains appropriate electronic hardware, for example suitable electronic computer and printout devices to generate a final digital printout of multiple analytical reaction rate results."

"The present invention relates to an improved method and apparatus for determining multiple analytical reaction rate results, particularly for clinical enzyme reactions. More particularly, the present invention is directed to a method and apparatus for the proper positioning of a plurality of samples and sample blanks for simultaneously making a plurality of rate measurements on each sample using a particular arrangement of electronic computer hardware to produce a digital printout of the reaction rate results."

"An object of the present invention is to provide an improved method and apparatus for making automated kinetic measurements for clinical enzyme reactions."

"Another object of the present invention is to determine the linearity of the reaction by making a plurality of measurements on each sample."

"Still another object of the present invention is to provide an improved spectrophotometer apparatus for the automatic positioning of multiple samples and sample blanks for measuring for example, double differential absorbance, that is, sample absorbance with respect to both blank absorbance and time."

"A further object of the present invention is to provide an improved method and apparatus for measuring different types of reaction rates during the same analytical run."

"A still further object of the present invention is to provide an improved method and apparatus for automatically substrating a blank measurement during an analytical run which is essential for clinical enzyme analysis if rapid and error-free results are to be realized."

"Still another object of the present invention is to provide an improved method and apparatus for making multiple, discrete measurements on a plurality of samples and sample blanks to affect simultaneous reaction rate analysis on all of the samples."

"Another object of the present invention is to combine with the above spectrophotometer apparatus, appropriate electronic hardware, including electronic computer and printout devices to generate a final digital printout of these simultaneous multiple kinetic measurements for clinical enzyme reactions."

This clearly reveals that this patent has limited application in that it discloses a single spectrophotometer which is used to measure a number of samples.

Even if a number of these systems were ganged together to form an array, each of the spectrophotometers would need to be calibrated individually.

The prior art disclosures above all attempt to overcome some of the problems associated with the use of spectrometers, but they all still suffer from severe problems in that they need to be individually calibrated and that the majority of them would not be appropriate for applications where real-time results are needed.

Even those that are capable of providing some form of real-time analysis suffer from the inherent calibration problems.

None of the disclosures is capable of forming part of an integrated system with a central hub connected to a number of spectrometer assemblies and in which results and calibration values can be stored.

SUMMARY OF THE INVENTION

It is an object of the present invention to address the above problems, or at least provide the public with a useful choice.

Further aspects and advantages of the present invention will become apparent from the following description which is given by way of example only.

According to one aspect of the present invention there is provided a method of processing data from at least one near infrared spectrophotometer, utilizing a central processing unit that is physically remote from the spectrophotometer, characterized by the steps of:

a) transferring the data from the spectrophotometer to a central processing unit that has access to individual calibrations for each of the spectrophotometers from which it receives data to process;

b) processing the data at the central processing unit; and c) transferring the processed data to an output device.

Although it is envisaged that the present invention can be applied to other spectrophotometers, the inventors consider that the present invention has particular application to solving the problems associated with near infrared spectrophotometers (NIRS). Thus, reference throughout the specification shall now be made to the spectrophotometer as being a NIRS.

The transfer of the data from the NIRS to the central processing unit may be achieved by a number of ways. For example, the transfer may be via a hard wire link, phone lines, across the Internet, microwave link, fiber optic cable or any other data transfer method.

The central processing unit (CPU) may be in a number of forms.

In one embodiment, the CPU may be a dedicated computer which can receive data from one or more NIRS. For example, the CPU maybe in close physical proximity to a number of machines in use. The CPU thus may operate on a local network.

In preferred embodiments of the present invention, the CPU is physically remote from the spectrophotometers. For example, the CPU may include a number of processors which are part of a large computer network able to receive data from the spectrophotometers, regardless of the physical location of the spectrophotometers in relation to the CPU.

For example, the CPU may be part of a server which is connected via the Internet to spectrophotometers which are logged on world-wide.

In some embodiments of the present invention, the CPU may contain or be able readily to access individual calibrations for each of the spectrophotometers from which it receives data to process.

The inventors are also aware that a recent development for near infrared spectrophotometers is the feature of having transferable calibrations. This means that one set of calibrations (for each physical substance) can be used for a large number of near infrared spectrophotometers. Thus, in some embodiments of the present invention, the central processing unit will contain or have access to a standard set of calibrations which can be used in the processing of data from a number of individual near infrared spectrophotometers.

Thus, it is envisaged that an aspect of the present invention is the provision of a data repository of calibrations for a number of physical substances which can be used to process the data from a number of spectrophotometers.

The output device to which the processed data is transferred may be the original spectrophotometer that supplied the data, or may be some other device. For example, the output device may be a printer, computer screen, control system, all of which may be closely associated with the spectrophotometer or distant therefrom.

It should be seen that the present invention offers considerable advantages over the prior art.

Firstly, the present invention obviates the need for having a separate processor associated with each individual spectrophotometer. This means that an investment can be made in the processing power of the CPU which can be more powerful than the processors previously used.

Thus, it may be possible to have a real time processing of the data. This provides great opportunities with control and automation enabling materials with contaminants or having a special quality to be treated accordingly.

It can be seen that the present invention allows the provision of effectively "dumb" spectrophotometers which act merely as peripherals and do not have processors to analyze their data.

This results in considerably cheaper machines as they have less componentry associated with them.

Of particular benefit to users of NIRS is that the present invention removes the need to calibrate each individual machine. Thus, the considerable time taken to calibrate machines and the associated expense is saved. This is especially so when a single set of transferable calibrations can be stored in the CPU to be used with a number of machines.

If, for example, a machine is faulty, then it can be readily replaced by another machine which can then send its data to the CPU. Again, there is no downtime in having to calibrate the spare machine. Even if the spare machine does not have transferable calibrations, it is envisaged that the machine's individual calibrations can still be stored on the CPU.

It is envisaged that in preferred embodiments, the spectrophotometers will have data buffering capabilities. This means that the data may be stored in the machine in the event that there is a communication breakdown between a machine and the CPU.

Another advantage of the present invention is that if a NIRS is stolen, then it cannot be used independently without a processor.

It is envisaged that each machine will have an individual identifier. Therefore it may be possible in some embodiments of the present invention to have a security alert when a stolen machine is reconnected to the central processing unit without authorization.

Whereas one aspect of the present invention is having a data repository of calibrations from various physical substances, another aspect is having a data repository of the processed results.

One example whereby this data storage may be useful may be in a plant that wishes to compare historical data from a number of its machines over a period of time. This way trends can be tracked or past anomalies identified.

However, this aspect of the present invention has more significance if the data received and processed by the CPU is from sites geographically remote to each other. Thus, the stored data can provide valuable information some time after the initial processing of the data is completed.

For example, it may be desirable to know in which parts of the world wheat has a certain characteristic. A repository of processed data can then be sorted with regard to this characteristic to provide the information required.

Having regard to the foregoing example, it is envisaged that in some embodiments not only will each of the spectrophotometers have a unique identifier, but associated with that identifier may be additional information such as physical location of the spectrophotometer.

Alternatively, or in addition, it is envisaged that the raw data sent from the spectrophotometer to the CPU may also include identifying information such as the source of the material being analyzed and so forth.

BRIEF DESCRIPTION OF THE DRAWINGS

Further aspects of the present invention will become apparent from the following description which is given by way of example only and with reference to the accompanying drawings in which.

DETAILED DESCRIPTION OF THE PREFERRED EMBODIMENTS

Figure 1:
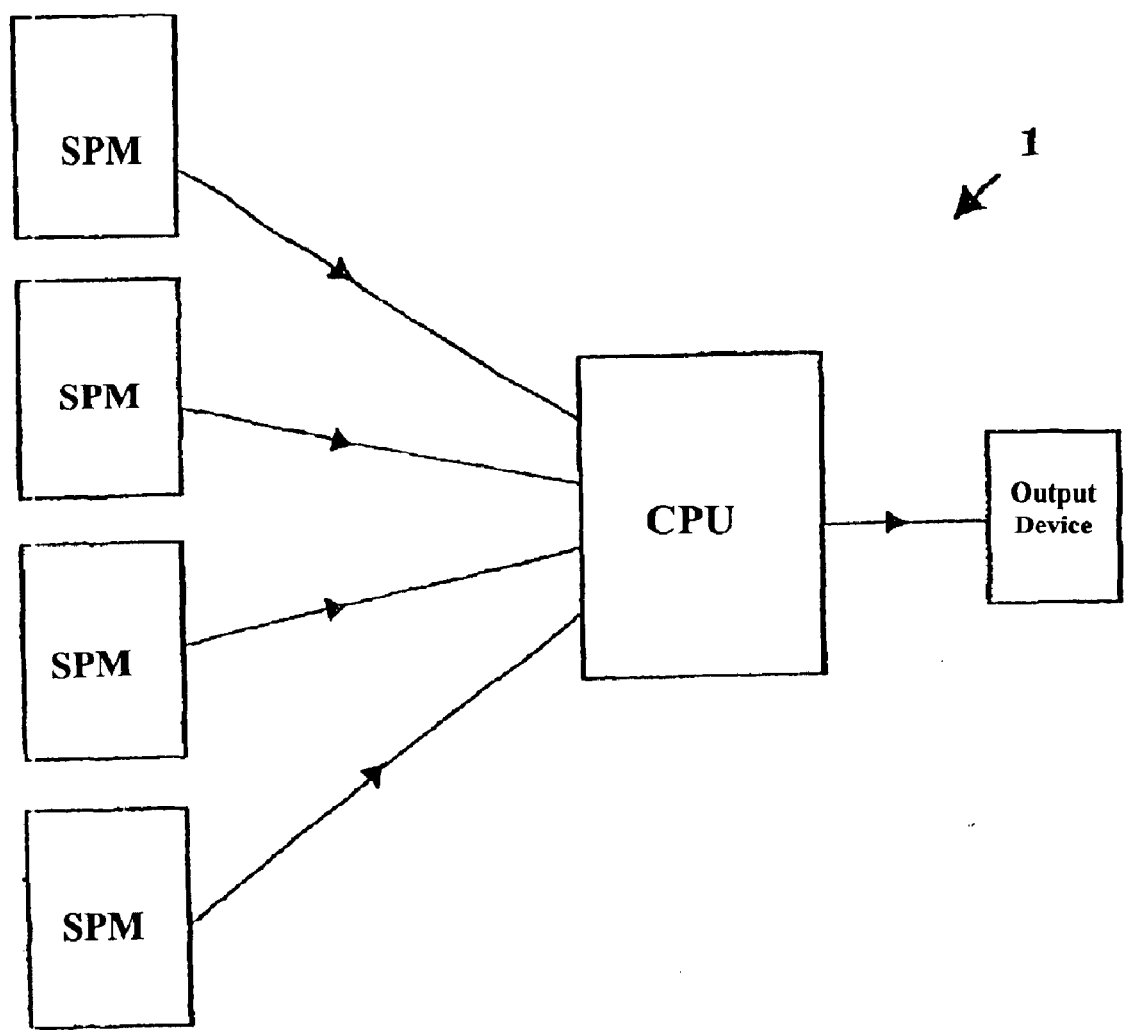
FIG. 1 is a schematic diagram illustrating the present invention in use on a localized network.

FIG. 1 is a schematic diagram of a localized network (generally indicated by arrow 1) in accordance with one aspect of the present invention.

Network 1 consists of a number of near infrared spectrophotometers 2, none of which has data processing capabilities.

Spectrophotometers 2 transfer their data by a hard wire to a central processing unit 3. Central processing unit 3 has one set of calibrations which are transferable and can be used in relation to the data coming from each of spectrophotometers 2. In some embodiments of the present invention the central processing unit 3 may have individual calibrations for each of spectrophotometers 2 as well.

Once central processing unit 3 has processed the data, this is then transferred to an output device 4. In this embodiment, output device 4 may be a control system which can operate the physical processing of the material being analyzed by the spectrophotometers 2 in accordance with the processed data received.

Figure 2:
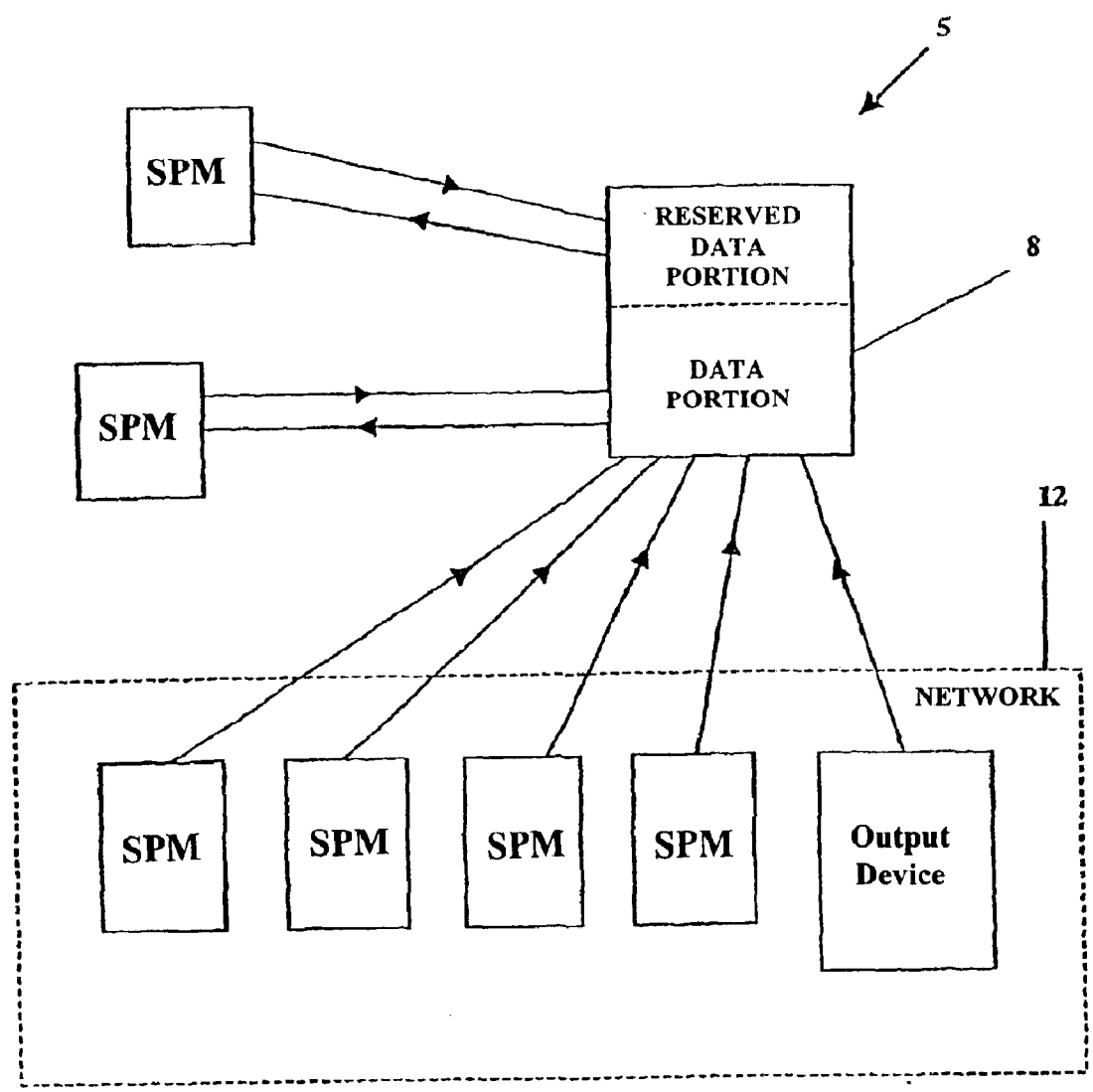
FIG. 2 is a schematic diagram illustrating the present invention in use on a remote network.

FIG. 2 illustrates a possible world-wide network generally indicated by arrow 5.

Network 5 has connected to it a spectrophotometer 6. The individual calibration in the reserved data portion 7 of a CPU 8 is used by CPU 8 to process the data. Once the data from spectrophotometer 6 is analyzed, it is then transferred back to spectrophotometer 6.

A spectrophotometer 9 shares its calibration values with a number of other spectrophotometers (for example, spectrophotometers 10). CPU 8 therefore accesses the transferable calibration values in the data portion 11. Again the data is sent back to spectrophotometer 9 once it is processed.

A network 12 represents a possible configuration whereby a number spectrophotometers 10 may be associated with the one entity. Spectrophotometers 10 may or may not be in physical proximity to each other. However, it is envisaged that the data from spectrophotometers 10 will still be processed using calibration data from data portion 11 of CPU 8. However, as spectrophotometers 10 are all associated with each other, it is envisaged in some embodiments that there may be provided a single output device 13 to which the CPU sends the processed data.

Aspects of the present invention have been described by way of example only and it should be appreciated that modifications and additions may be made thereto without departing from the scope thereof as defined in the following claims.

Having disclosed our invention which we claim as new and to be secured by Letters Patent of the United States of America is:

1. A method of processing data from at least near infrared spectrophotometer that has a unique electronic identifier, utilizing a central processing unit that is physically remote from the spectrophotometer, said method comprising the steps of:
   a) assigning a unique electronic identifier to each spectrophotometer that is connected to the central processing unit;
   b) transferring the data from the spectrophotometer to the central processing unit that has access to individual calibrations for each of the spectrophotometers from which the central processing unit receives data to process;
   c) determining, by recognizing the unique electronic identifier associated with the data, which spectrophotometer has sent the data to the central processing unit;
   d) processing the data at the central processing unit using the individual calibration for the spectrophotometer determined to have sent the data;
   e) transferring the processed data to an output device.

2. A method as claimed in claim 1, wherein the central processing unit has access to a standard set of calibrations which can be used in the processing of data for a plurality of spectrophotometers.

3. The method as claimed in claim 1, wherein the central processing unit has access to a data repository of calibrations for a plurality of spectrophotometers.

4. The method as claimed in claim 1, wherein the central processing unit has access to a data repository for data processed from a plurality of spectrophotometers.

5. The method as claimed in claim 1, wherein the output device is the spectrophotometer from which the data has been reviewed.

6. The method as claimed in claim 1, wherein the data sent to the central processing unit has information about the data of the sample analyzed by the spectrophotometer.

7. In combination, a central processing unit and a near infrared spectrophotometer connected to the central processing unit that is physically remote from the spectrophotometer and configured to analyze data acquired by the spectrophotometer;
   wherein the spectrophotometer includes a unique identifier that is sent with the acquired data to the central processing unit to provide means for the central processing unit to associate the data received from the spectrophotometer with an individual calibration for the spectrophotometer, wherein said individual calibration is used by the central processing unit in analyzing the data received from the spectrophotometer.

8. The combination as claimed in claim 7, wherein said spectrophotometer includes a data buffer for holding the data acquired from the material analyzed.

9. A method of processing data from multiple near infrared spectrophotometers, said method comprising the steps of:
   connecting a central processing unit that is physically remote from the spectrophotometers to said spectrophotometers;
   assigned a unique electronic identifier to each of the spectrophotometers connected to the central processing unit;
   acquiring data by at least one of said spectrophotometers;
   transferring the data from said at least one spectrophotometers to the central processing unit;
   determining, based on the unique electronic identifier associated with the data, which spectrophotometer has sent the data to the central processing unit;
   processing the data at the central processing unit; and
   outputting the processed data to an output device;
   wherein said method further comprises:
   providing a data repository of calibrations, said data repository comprising at least an individual calibration for each of the spectrophotometers from which said central processing unit receives data to process; and
   using the individual calibrations for the respective each of the spectrophotometers in the processing of all data for the respective each of the spectrophotometers.

10. The method as claimed in claim 9, wherein said data repository further comprises, besides said individual calibrations, a standard set of transferable calibrations which can be used in the processing of data for a number of said spectrophotometers.

11. The method as claimed in claim 10, wherein some of said spectrophotometers share same calibration values stored in the standard set of transferable calibrations while others being calibrated with their individual calibrations.

12. The method as claimed in claim 9, wherein the output device is said at least one spectrophotometer from which the data has been received.

13. The method as claimed in claim 12, wherein the processed data being output back to said at least one spectrophotometer includes a calibration determined in said calibrating step for said at least one spectrophotometer.

14. The method as claimed in claim 13, wherein said calibrating step further comprises using the data acquired by said at least one spectrophotometer.

15. The method as claimed in claim 9, wherein the data acquired in said acquiring step is transferred, in said transferring step, to the central processing unit without being processed by said at least one spectrophotometer.

16. The method as claimed in claim 9, further comprising storing the acquired data in a data buffer of said at least one spectrophotometer without processing said acquired data by said spectrophotometer.

17. The method as claimed in claim 9, wherein said unique electronic identifier further includes information about the physical location of the associated spectrophotometer.

18. The method as claimed in claim 9, further comprising providing a database containing data previously processed from said spectrophotometers.

19. The method as claimed in claim 9, wherein said outputting step includes commonly outputting the data received from a number of said spectrophotometers to said output device.

20. The method as claimed in claim 9, further comprising replacing one of said spectrophotometers with a spare spectrophotometer; and calibrating said spare spectrophotometer using its individual calibration stored in said data repository of calibrations.

21. The method as claimed in claim 9, further comprising replacing one of said spectrophotometers with a spare spectrophotometer, the spectrophotometer being replaced has been calibrated with calibration values stored in the standard set of transferable calibrations; and calibrating said spare spectrophotometer using its individual calibration stored in said data repository of calibrations, rather than with calibration values stored in the standard set of transferable calibrations.

22. The method as claimed in claim 9, further comprising generating an alert when a spectrophotometer having an unauthorized electronic identifier is connected to said central processing unit.

* * * * *